United States Patent [19]
Feist et al.

[11] Patent Number: 6,146,558
[45] Date of Patent: *Nov. 14, 2000

[54] STRUCTURE AND METHOD FOR MOLDING OPTICAL DISKS

[75] Inventors: Thomas Paul Feist, Clifton Park; Thomas Bert Gorczyca, Schenectady; Richard Joseph Saia, Niskayuna; Paul Alan McConnelee, Schenectady, all of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/071,624

[22] Filed: May 1, 1998

[51] Int. Cl.[7] ..................................................... B29D 11/00
[52] U.S. Cl. ..................... 264/1.33; 249/114.1; 249/134; 249/135; 264/328.16; 425/810; 427/135
[58] Field of Search ................................... 264/1.33, 106, 264/107, 328.16; 249/114, 114.1, 116, 135, 134; 425/547, 810; 427/133, 135

[56] References Cited

U.S. PATENT DOCUMENTS

| | | |
|---|---|---|
| 4,225,109 | 9/1980 | Yotsutsuji et al. . |
| 4,783,041 | 11/1988 | Sakaida et al. . |
| 4,879,082 | 11/1989 | Kudo et al. . |
| 5,041,247 | 8/1991 | Kim . |
| 5,124,192 | 6/1992 | Kim et al. . |
| 5,176,839 | 1/1993 | Kim . |
| 5,288,519 | 2/1994 | Baumgartner et al. . |
| 5,290,597 | 3/1994 | Baumgartner et al. . |
| 5,302,467 | 4/1994 | Baumgartner et al. . |
| 5,324,473 | 6/1994 | Baresich . |
| 5,388,803 | 2/1995 | Baumgartner et al. . |
| 5,458,818 | 10/1995 | Kim et al. . |
| 5,897,814 | 4/1999 | Niemeyer et al. ..................... 264/1.33 |

FOREIGN PATENT DOCUMENTS

| | | |
|---|---|---|
| 0489335A | 11/1991 | European Pat. Off. . |
| 0796713A | 2/1997 | European Pat. Off. . |
| 87-180541 | 8/1987 | Japan . |
| 87-5824 | 8/1987 | Japan . |
| 88-71325 | 3/1988 | Japan . |

OTHER PUBLICATIONS

U. S. Patent Application "Method for Injection Molding of Optical Discs" by Matthew F.Niemeyer, et al, Ser. No.: 08/874,235, Atty Docket No. 8CT–5646, filed Jun. 13, 1997.

DuPont Technical Bulletin "Pyralin Polyimide Coatings for Electronics VM–651 and VM–652 Adhesion Promoters", H–73153, effective Jun., 1997, one page.

GE Plastics Article "Better Surface Replication for DVD and Recordable Discs Through Managed Heat Transfer" by Matthew F. Niemeyer, et al, pp. 1–10+7 sheets of figures, presented at ITA–MOMOS conference Oct. 1996, San Francisco, CA.

GE Plastics Article "The Application of Managed Heat Tranfer to the Production of Higher Quality Optical Discs" by Matthew F. Niemeyer, et al, 9 pages+7 pages of figures presented at Replitech Conference Jun. 1996 California.

*Primary Examiner*—Mathieu D. Vargot
*Attorney, Agent, or Firm*—Ann M. Agosti; Jill M. Breedlove

[57] ABSTRACT

A method for molding an optical disk comprises: applying a thermally insulative insert coating to at least one thermally insulative mold insert to provide at least one coated mold insert having a reduced surface roughness; positioning the coated mold insert between a thermally conductive mold form and a portion of a thermally conductive mold apparatus; injecting a molten thermoplastic material into the mold apparatus; retaining the material in the mold apparatus for a time sufficient for the molten thermoplastic material to cool below its glass transition temperature to form the optical disk; and ejecting the optical disk from the mold apparatus. In another embodiment, the mold insert is coated or laminated on the mold form with the mold insert having a coefficient of thermal expansion compatible with the coefficient of thermal expansion of the mold form. In another embodiment, the mold insert is fabricated by being applied, cured, and then removed from a release layer.

10 Claims, 6 Drawing Sheets

STRUCTURE AND METHOD FOR MOLDING OPTICAL DISKS

BACKGROUND OF THE INVENTION

The present invention relates to a structure and process for injection molding optical and compact disks.

Injection molding involves injecting molten thermoplastic resin into a mold apparatus. Molds for injection molding of thermoplastic resin are usually made from metal materials such as iron, steel, stainless steel, aluminum, or brass because these materials have high thermal conductivity and thus permit the melt of thermoplastic resin to cool rapidly and shorten the molding cycle time. A drawback to rapid cooling in these molds is that the injected resin freezes instantaneously at the mold surface, resulting in a thin solid layer. Quick quenching of the melt at the mold surface creates a rough surface (instead of a high quality optical surface) which can impact disc performance. The quick solidification of the melt combined with variable radial flowability of the materials makes the uniform melt flow and uniform surface replication required for an optical disk difficult to achieve. Non-uniform flow and surface imperfections can result in areas on an optical disk with high bit errors.

In the injection molding of compact discs, for audio, video, or computer data storage and retrieval applications, heat transfer through the mold thus has a strong effect on molding time and disc attributes such as birefringence, flatness, and accuracy of feature replication. For a process to be economical, a careful balance must be maintained between low cycle times and the process parameters needed to meet the quality requirements.

A method for affecting heat transfer and improving the cycle time during injection molding by incorporating insulation into the mold has been described in commonly assigned Kim et al., U.S. Pat. No. 5,458,818. In Kim et al., a multilayer mold is used in which a metal core has an insulating layer bonded thereto for slowing the initial cooling of the resin during the molding operation. The insulating layer comprises material having both low thermal diffusivity and conductivity, thus slowing the cooling of the molded resin, and good resistance to high temperature degradation, permitting use in a mold maintained at high temperatures. One or more skin layers of hard material, typically metal, can be bonded to the insulating layer.

Another method for affecting heat transfer is described in Nakamura et al., Japanese Unexamined Patent Application Disclosure Bulletin No. 88-71325. In Nakamura et al., a layer of synthetic resin is formed on a stamper by coating or lamination before the stamper is placed on the core molding surface of the metal mold.

The use of an insulating layer is desirable so as to cause a minimal change in the size and shape of the molding tool and equipment. For compact discs, stringent requirements of optical clarity, surface morphology, and replication of surface features of submicron dimensions obviate the use of common insulating materials, which do not provide a smooth enough surface, are not stable for long periods at the mold temperature, or cannot withstand the repeated application of high pressure during the molding process.

For a sheet or film to be useful for managing heat transfer for a mold it must have a very smooth surface (<0.1 μm surface roughness) over a large area so that it will not introduce feature replication errors or surface imperfections into the manufactured disk. It is also preferred that the surface be compliant to attenuate minor imperfections in the molding tool while maintaining mechanical and dimensional integrity during the molding process.

SUMMARY OF THE INVENTION

It is therefore seen to be desirable to provide a structure and method for molding optical disks having improved surface replication and improved molding characteristics.

Briefly, in accordance with one embodiment of the present invention, a method for molding an optical disk comprises: applying a thermally insulative insert coating to at least one thermally insulative mold insert to provide at least one coated mold insert having a reduced surface roughness; positioning the at least one coated mold insert between a thermally conductive mold form and a portion of a thermally conductive mold apparatus; injecting a molten thermoplastic material into the mold apparatus; retaining the material in the mold apparatus for a time sufficient for the molten thermoplastic material to cool below its glass transition temperature to form the optical disk; and ejecting the optical disk from the mold apparatus.

In a related embodiment, the thermally insulative mold insert is coated on the thermally conductive mold form with the mold insert having a coefficient of thermal expansion compatible with the coefficient of thermal expansion of the mold form. An adhesion promoter can be applied to the mold form prior to the coating of the mold insert.

In another related embodiment, the thermally insulative mold insert is laminated on the thermally conductive mold form using an adhesive with the mold insert having a coefficient of thermal expansion compatible with the coefficient of thermal expansion of the mold form and the adhesive comprising a material which does not significantly shrink and which has a coefficient of thermal expansion compatible with the coefficients of thermal expansion of the mold form and the mold insert.

According to another embodiment of the present invention, a mold insert for being positioned in a mold apparatus between the mold apparatus and a mold form comprises a layer of thermally insulative mold insert material and an insert coating applied on at least one surface of the mold insert material for providing a reduced surface roughness.

In a related embodiment, a mold form and a mold insert for being positioned in a mold apparatus comprise an adhesion promoter overlying a thermally conductive mold form and a thermally insulative mold insert coated on the adhesion promoter and the thermally conductive mold form, the mold insert having a coefficient of thermal expansion compatible with the coefficient of thermal expansion of the mold form.

In another related embodiment, a mold form and a mold insert for being positioned in a mold apparatus comprise: an adhesive between a thermally conductive mold form and a thermally insulative mold insert, the mold insert having a coefficient of thermal expansion compatible with the coefficient of thermal expansion of the mold form, the adhesive comprising a material which does not significantly shrink and which has a coefficient of thermal expansion compatible with the coefficients of thermal expansion of the mold form and the mold insert.

According to another embodiment of the present invention, an optical disk mold apparatus comprises: at least one coated mold insert comprising a thermally insulative insert coating applied to at least one thermally insulative mold insert to provide at least one coated mold insert having a reduced surface roughness; a thermally conductive mold form; and a thermally conductive mold apparatus. The at least one coated mold insert being positioned between the thermally conductive mold form and a portion of the thermally conductive mold apparatus.

In a related embodiment, the optical disk mold apparatus includes an adhesion promoter or an adhesive overlying a thermally conductive mold form and a thermally insulative mold insert coated on the adhesion promoter or adhesive and the thermally conductive mold form, the mold insert having a coefficient of thermal expansion compatible with the coefficient of thermal expansion of the mold form.

According to another embodiment of the present invention, a method for fabricating a mold insert for use in molding an optical disk comprises: applying a release layer to a substrate; coating a solution of liquid insulative mold insert material on the release layer; curing the mold insert material to form the mold insert; and removing the mold insert from the release layer and the substrate.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

A thin, smooth polymer sheet comprising a homogeneous film or composite layered structure is used to control heat flow during injection molding of a compact disc and to thereby provide improved disc quality and/or reduced cycle time. The sheet is positioned behind the information side and/or mirror side of the mold, thereby managing heat transfer through the mold walls and allowing improved replication of mold features and/or reduced mold temperature. The present invention describes several embodiments for forming the insulating film. In each of the embodiments, the process steps are performed in an environment that is as clean as feasible.

Figure 1:
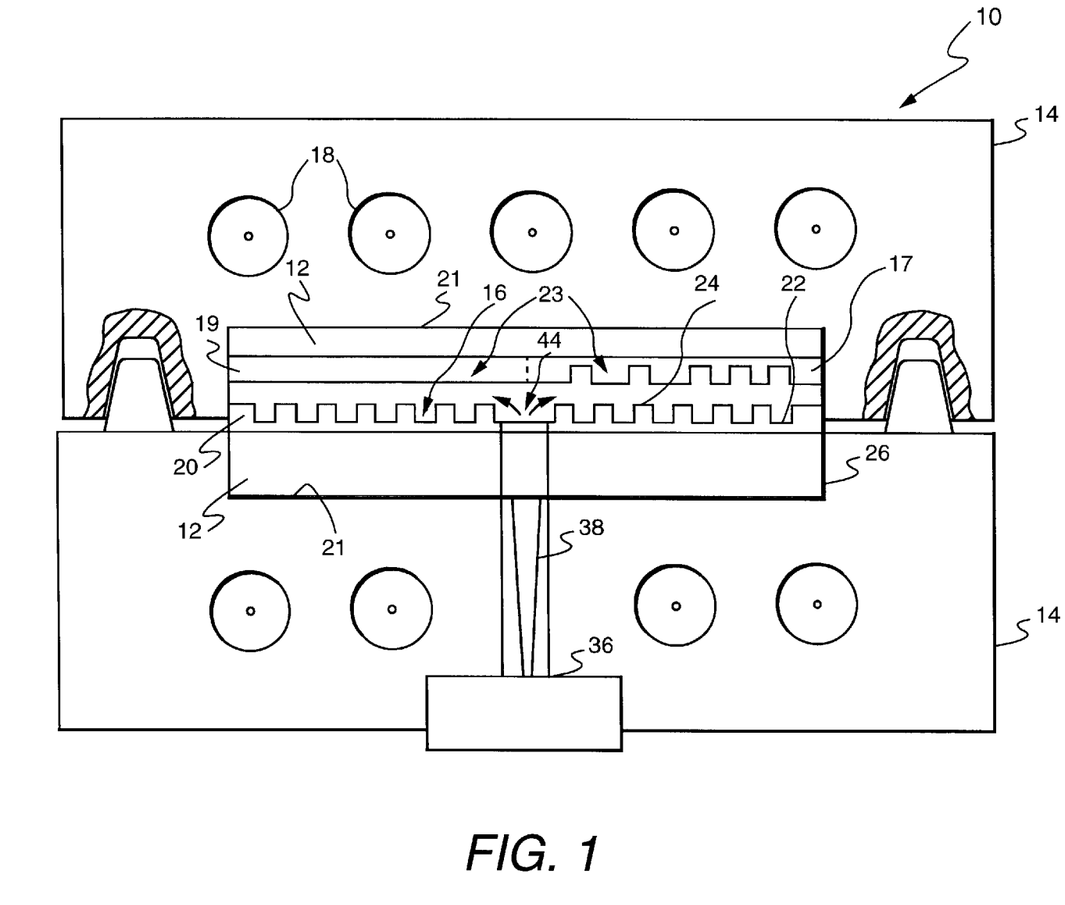
FIG. 1 is a side view of an injection molding embodiment.

FIG. 1 is a sectional side view of an injection mold 10 including a thermally insulative mold insert 12 and a pair of mold halves 14 of high thermally conductive material forming a mold cavity 16. Thermally insulative is meant to include materials having coefficients of thermal conductivity less than or equal to about 50 W/m·K. Thermally conductive is meant to include materials having coefficients of thermal conductivity greater than or equal to about 100 W/m·K.

Cooling lines 18, such as copper pipes, are provided in each half 14 for receiving a cooling fluid to reduce cycle time. At least one compact disk or optical disk stamper mold form 20 is positioned in the mold cavity 16 as shown and secured therein in a known manner. The stamper 20 has a grooved or pitted surface 22 which carries information.

If desired, a second mold form 23 can additionally be positioned in mold cavity 16. For purposes of example, a smooth surface mold form is represented by portion 19 and a second stamper mold form having a grooved or pitted surface for carrying information is represented by portion 17. Thus a stamper mold form 20 can be the only mold form, can be used with a smooth mold form, or can be used with a second stamper mold form. The stamper and smooth mold forms are collectively referred to hereinafter as mold forms. Typically, mold forms comprise electroplated nickel and mold halves comprise steel.

Each mold half 14 can have a surface 21 for supporting the mold insert 12. The insert 12 may be in the form of a single thin insulating layer or multilayer insulated structure which can be fabricated from low thermally conductive materials such as high temperature thermoplastic materials, thermoset materials, plastic composites, porous metals, ceramics and low-conductivity metal alloys. Preferably, the insert may be a flexible film such as a polyimide film from about 10 micrometers to about 500 micrometers thick. The insert may alternatively comprise a film of polyamideimide, polyethersulfone or polyetherketone, or any other material with adequately low thermal conductivity.

Hot thermoplastic resin can be injected into the mold cavity via sprue bushing 36 and sprue 38. Heat from the resin is absorbed through the stamper 20 (and smooth mold form 19 or second stamper 17, if applicable) with the heat transfer being regulated by the at least one mold insert 12 which prevents quick cooling of the resin 44 and causes the stamper to reheat. This results in a hot plastic surface at the interface between the stamper and resin 44 for a short time period.

In practice, it is most useful for mold inserts to be positioned on each side of the mold as shown in FIG. 1. The present invention is also useful if a mold insert is used with one or both mold halves.

Figure 2:
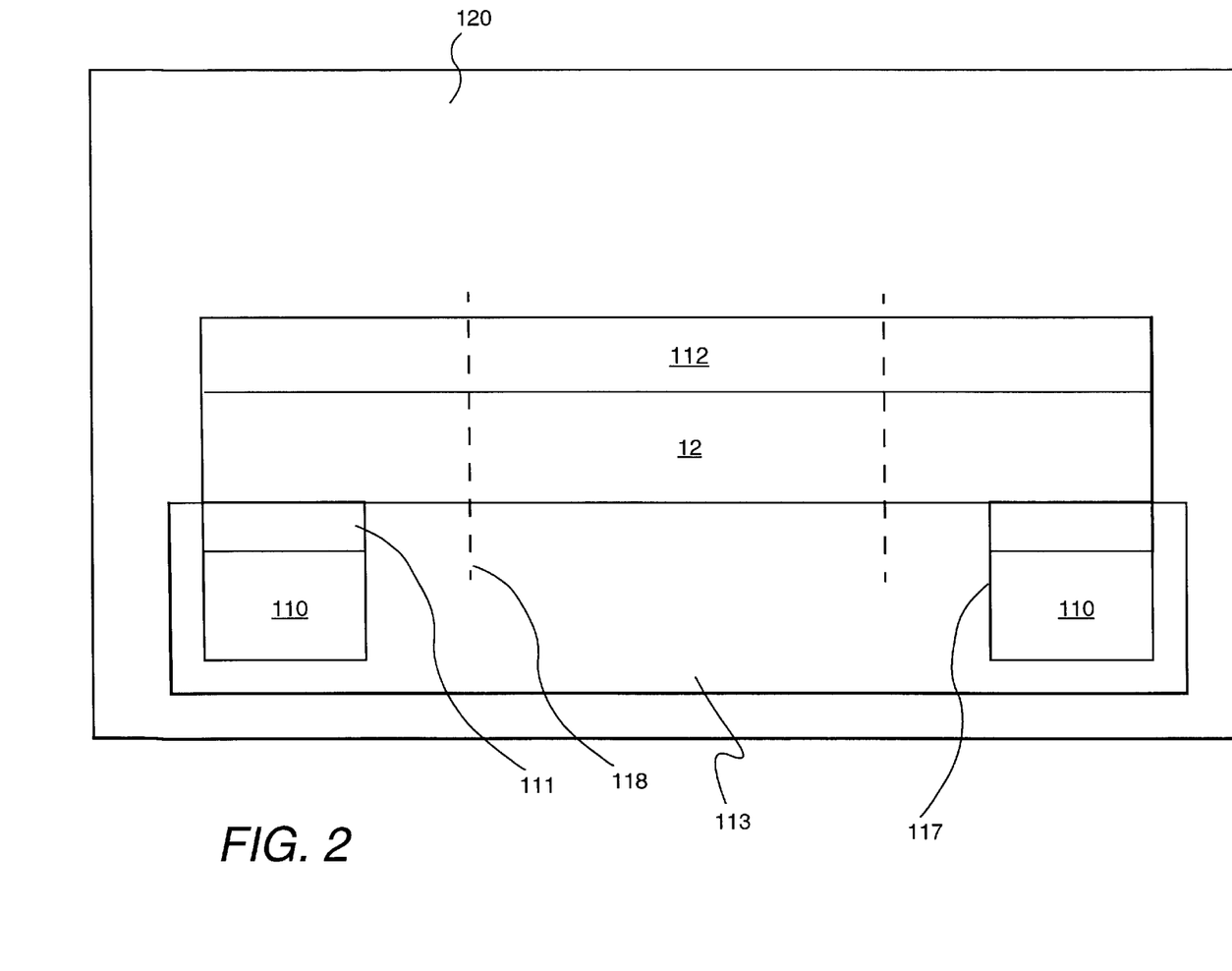
FIG. 2 is a side view of an insert coating on an insulative mold insert.

FIG. 2 is a side view of an insert coating 112 on the insulative mold insert 12 illustrating one embodiment of the present invention in which the mold insert is smoothed by the application of the insert coating.

Because of the high temperature and pressure conditions in the molding process, the mold inserts 12 require high thermal and dimensional stability. The film surface roughness of a number of potential mold insert materials was characterized using contact and non-contact surface profilometry. Several grades of KAPTON® polyimide (KAPTON is a trademark of DuPont Co.) film, including FN, HN, and E, with thickness of 0.0005 inches (12.7 micrometers) to 0.005 inches (127 micrometers) were characterized. KAPTON E polyimide film was found to have minimal surface features of roughly 0.2 micrometers. Other potential insert materials include those discussed above with respect to FIG. 1.

In the present invention, the surface roughness is further reduced by applying the insert coating 112. Preferably the insert coating is cast from a solvent. The material used for the insert coating possesses several characteristics including good adhesion to the insert, stability during the molding process, surface smoothness, compliance, and acceptable thermal insulating properties. Appropriate materials include polyimides, modified polyimides, polyetherimides, modified polyetherimides, siloxane modified polyetherimides, or other thermally stable polymers.

The stability and compliance of these coatings can be further optimized by blending them with compatible epoxy resins to provide a thermal setting film. The amount of epoxy resin added can be adjusted to provide films with varying cross-linked densities. Use of a composite structure comprising customized surface coatings will provide useful characteristics for the thermal barrier. Lupinski et al., U.S. Pat. No. 5,169,911 describes thermal setting blends comprising polyimide and epoxy resins, for example.

In one embodiment, insert 12 is mounted on a frame 110 using an adhesive 111. The frame may comprise, for example, a circular INVAR™ alloy frame (INVAR is a trademark of Carpenter Technology Corp. for an alloy including Ni 36, steel 64% with carbon content 0.2%). After a polyimide is mounted on an INVAR alloy frame and baked, upon cooling the polyimide contracts more than the frame and a tight surface is formed.

Figure 8:
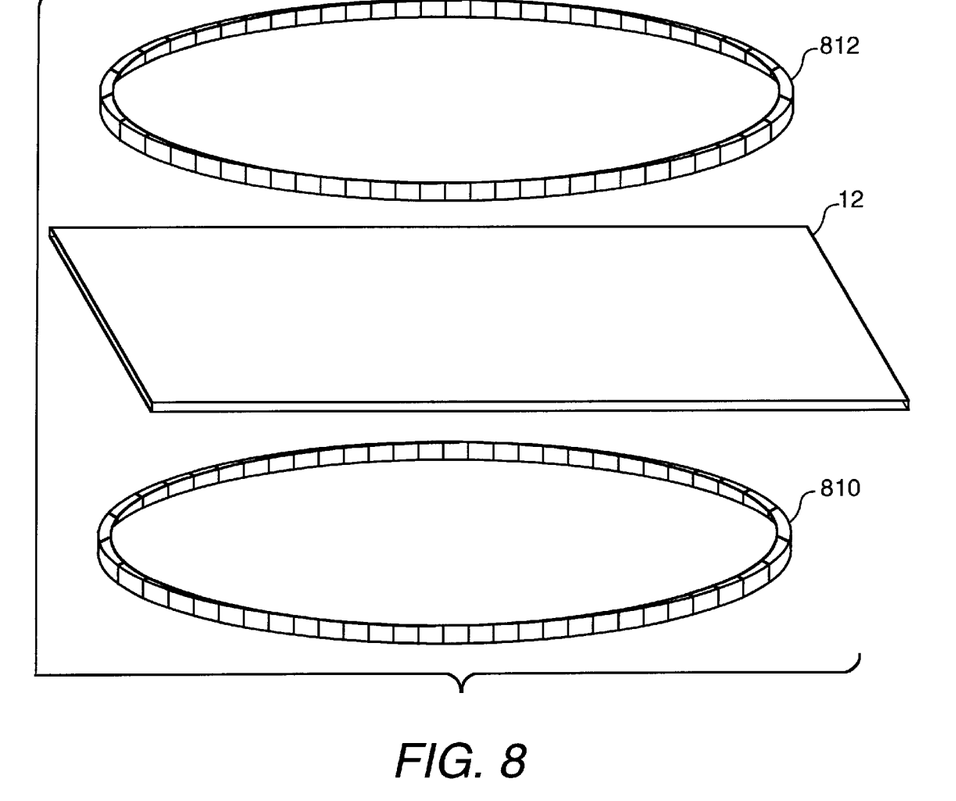
FIGS. 8 and 9 are perspective views of insulative mold insert material prior to application of an insert coating.
Figure 9:
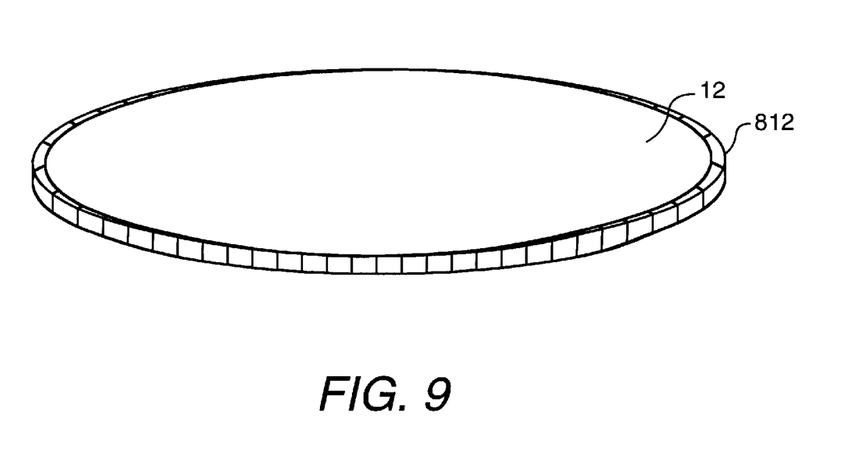

Alternatively, as shown in FIGS. 8 and 9, insert 12 can be mounted by pressing it into two snap-rings 810 and 812. The insert can then be measured for taughtness and uniformity prior to continuation of the coating process.

The surface of the insert can be prepared for application of the insert coating by RIE (Reactive Ion Etching) to enhance adhesion. Next a liquid form of the insert coating material is applied on the insert surface. In a preferred method, spin coating is used with a rotating tool 113. In one embodiment, rotating tool 113 includes a recessed portion 117 in which the frame 110 can be positioned to leave a flat and supported tool surface on which the mold insert rests. As alternatives to spin coating, other appropriate coating techniques include dip coating, meniscus coating, and spray coating, for example.

The insert and insert coating are then baked in a heating unit 120 to remove the solvent and cure the insert coating. In one embodiment wherein an insert 12 comprising KAPTON E polyimide was coated with a 12 $\mu$m thick layer of ULTEM® polyetherimide (ULTEM is a trademark of the General Electric Co.) film cast from acetophenone/anisole solvents, the resulting surface roughness was less than 0.1 $\mu$m.

If the area of the frame 110 is large enough, the surface of the resulting coated mold insert can be examined, and the coated insert can be punched so that the punched (used) portion includes the smoothest portion of the coated mold insert and any unexpectedly rough surfaces are avoided.

Figure 3:
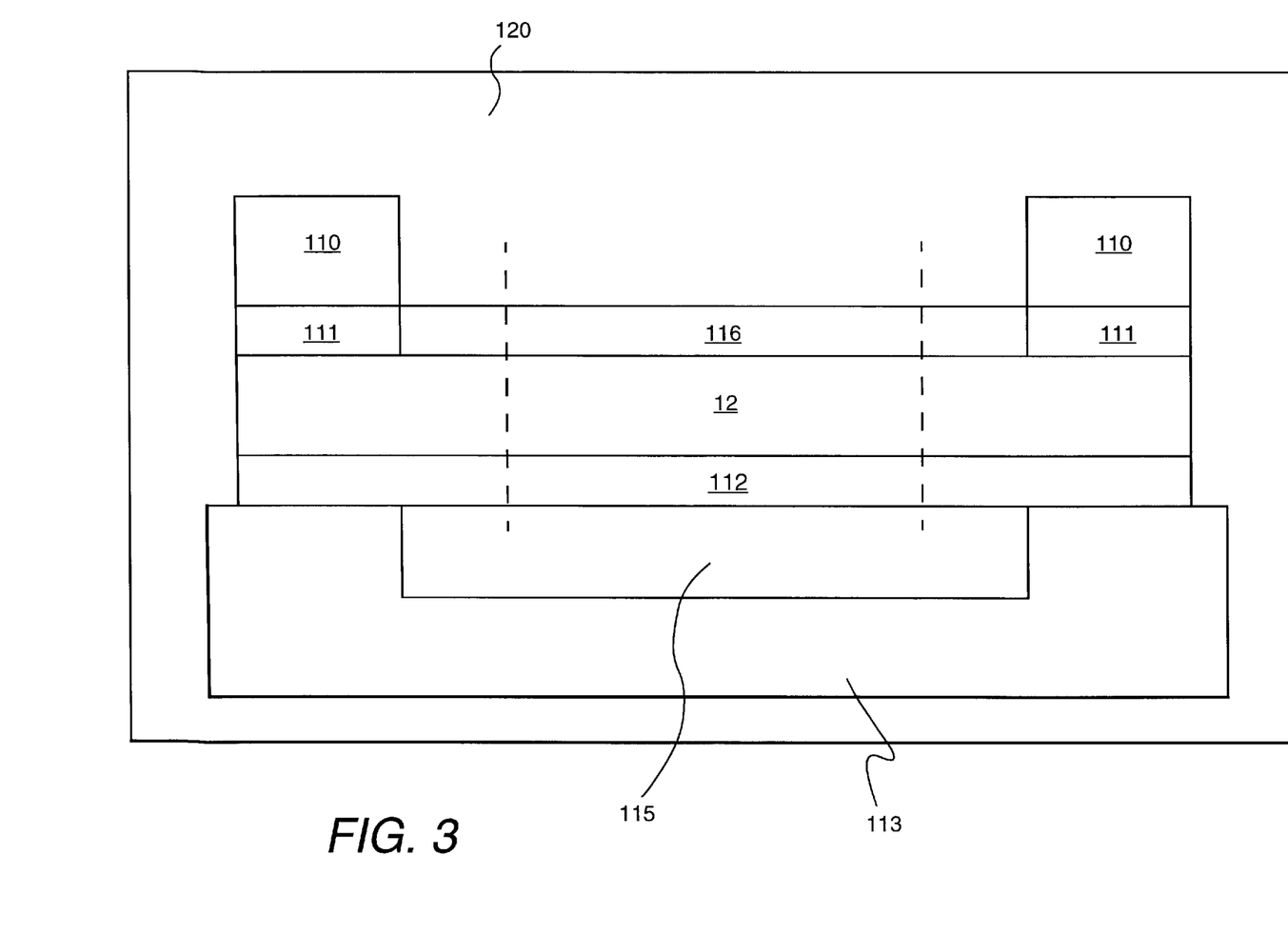
FIG. 3 is a side view of insert coatings on both sides of an insulative mold insert.

FIG. 3 is a side view of insert coatings 112 and 116 on both sides of an insulative mold insert 12. Coating of both sides of the insert is possible and will balance stresses in the insert that arise from any thermal expansion mismatch between the insert and applied insert coating. If only one side of the mold insert is to be coated, it is preferable to position the coated side adjacent the mold form.

In this embodiment, one side can be coated with insert coating 112 as shown in FIG. 2 and the frame and mold insert can then be turned over for application of the second insert coating 116. Preferably at least a soft bake of the first insert coating 112 is performed prior to turning over the mold insert. A hard bake (cure) of the first insert coating can occur either prior to turning over the mold insert or simultaneously with a hard bake of the second insert. In one embodiment, a soft bake includes baking at about 60–100° C. for a range of time from about fifteen minutes to about three hours, and a hard bake includes baking in a nitrogen atmosphere at about 200–300° C. for a range of time from about one hour to about three hours.

Rotating tool 113 preferably includes an opening 115 so that the first insert coating 112 does not come in direct contact with the rotating tool. This opening prevents contact and thus scratches from forming in the first insert coating.

Figure 4:
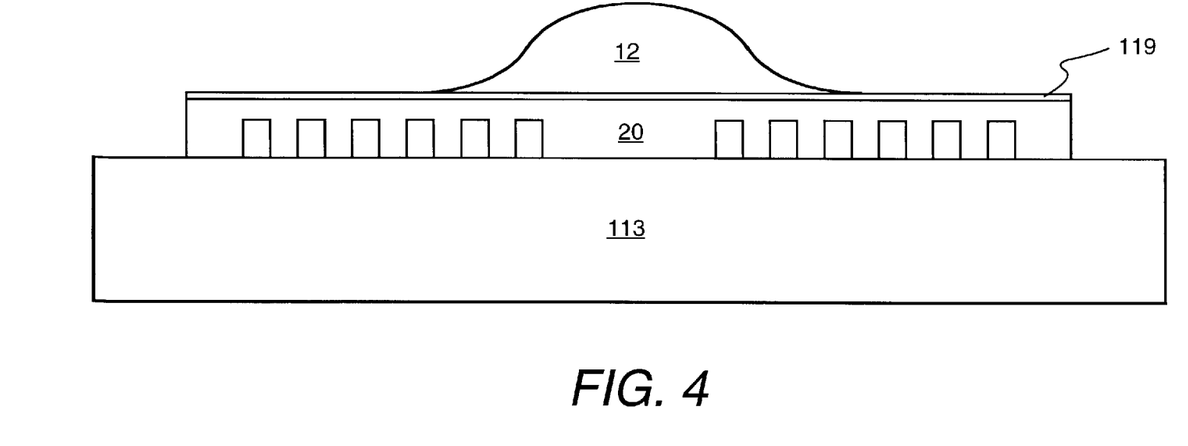
FIG. 4 is a side view of liquid insulative mold insert material on a stamper.

FIG. 4 is a side view of liquid insulative mold insert material 12 on a stamper 20 illustrating an embodiment wherein the insert is applied directly to the stamper. Although FIGS. 4 and 5 relate to application of the insert on a stamper, the process works in the same manner for applying the insert on a smooth surface mold form 19 (shown in FIG. 1). The mold form may comprise a conventional metal mold form or a mold form which has been modified during its manufacture.

In the present invention, the insert material is selected to have coefficient of thermal expansion compatible with the coefficient of thermal expansion of the mold form. It is expected that insert material coefficients of thermal expansion should be equal to or less than a multiple of three times the coefficient of thermal expansion of the mold form. In a preferred embodiment, the insert material coefficient of thermal expansion is equal to or less than a multiple of two times the coefficient of thermal expansion of the mold form. In one embodiment, for example, the insert material comprises ULTRADEL™ 5106 polyimide (ULTRADEL is a trademark of Amoco Chemicals of Naperville, Ill.) having a coefficient of thermal expansion in the plane of the film of about 24 ppm/° C. (parts per million per degrees centigrade), and the mold form comprises nickel having a coefficient of thermal expansion of about 13 ppm/° C.

In another preferred embodiment, prior to application of the insert material on the mold form, an adhesion promoter 119 is applied to the mold form. This is a beneficial feature because good adhesion of the mold insert to the mold form is important for achieving a smooth surface of the mold insert on the mold form. If the mold insert were to delaminate or bubble on the mold form, optical disks molded by the mold form would have low quality.

The adhesion promoter can be applied by spin, dip, spray, or meniscus coating and dried. The adhesion promoter comprises a coupling agent suspended in a solvent and has a thickness sufficient to coat the mold form. In one embodiment the adhesion promoter comprises an organosilane such as, for example, α-amino propyltriethoxysilane (the active ingredient in DuPont Co.'s organosilanes marketed under the order numbers VM-651 and VM-652).

In the embodiment of FIG. 4, insert material 12 in liquid form is positioned in the middle of the back surface of the stamper which itself is positioned on rotating tool. In one embodiment the insulator material comprises polyimide. Alternatively, other appropriate materials include polyetherimide, polyamideimide, polyethersulfone, polyetherketone, or thermoplastic, thermoset, plastic composite, or other materials with adequately low thermal conductivity. The volume of the insulator material will depend on the desired thickness and the area to be coated. In one embodiment, the volume ranges from about three milliliters to about five milliliters.

Figure 5:
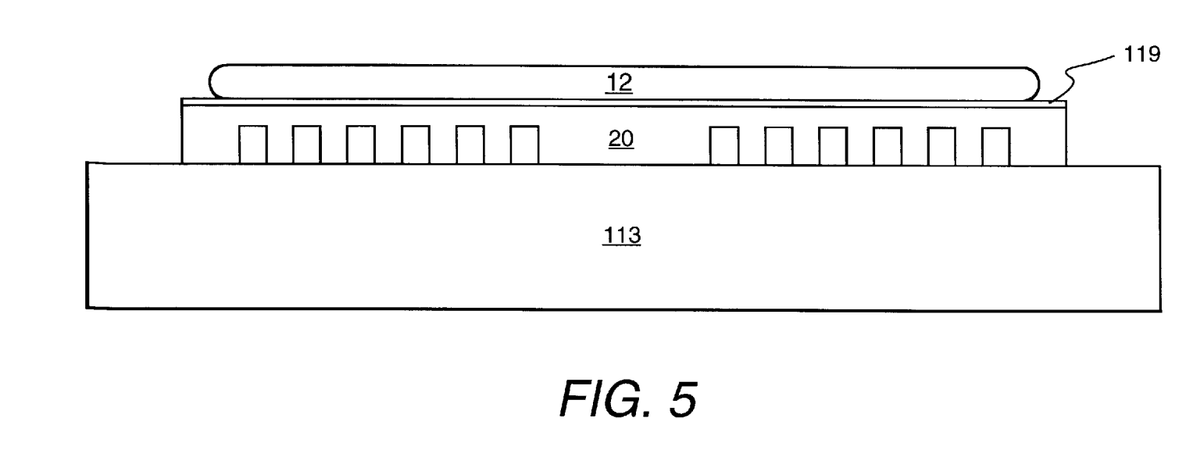
FIG. 5 is a view similar to that of FIG. 4 with the insert material spread over the stamper.

FIG. 5 is a view similar to that of FIG. 4 with the insert material spread over the stamper. The stamper is spun (rotated) on rotating tool 113 to distribute the insert material over the surface of the stamper to a desired thickness. In one embodiment, the stamper is spun in the range of about 1000

RPM (rotations per minute) to about 3000 RPM for a time ranging from about 20 seconds to about 30 seconds, for example. As discussed above, other coating techniques include dip coating, meniscus coating, and spray coating, for example.

The desired thickness of the insert will vary according to the embodiment in which the insert will be used, but generally the thickness will be in the range of about 5 micrometers to about 250 micrometers. In embodiments in which the insert will only be provided on one side of the mold, a thinner layer in the range of about 5 micrometers to about 25 micrometers is more appropriate for even heat transfer. In embodiments where inserts are present on both sides of the mold, thicker layers can be used. These embodiments are desirable for improving disk quality because thicker insulation permits the molding process to be run at lower melt and mold temperatures, but many molding machines are not adapted to include an insert on the smooth side of the mold.

After the insert material is applied and coated, the stamper and insert material are cured. Curing can be performed in a two step process, for example, by baking at about 100° C. for a range of time from about fifteen minutes to about three hours followed by baking in a nitrogen atmosphere at about 200–300° C. for a range of between one hour to three hours.

In some embodiments, several layers of insert material may have to be applied sequentially in order to build up an insert of the appropriate thickness and/or composite structure. After curing, the stamper and insert can be punched and packaged for shipment and/or molding.

Figure 6:
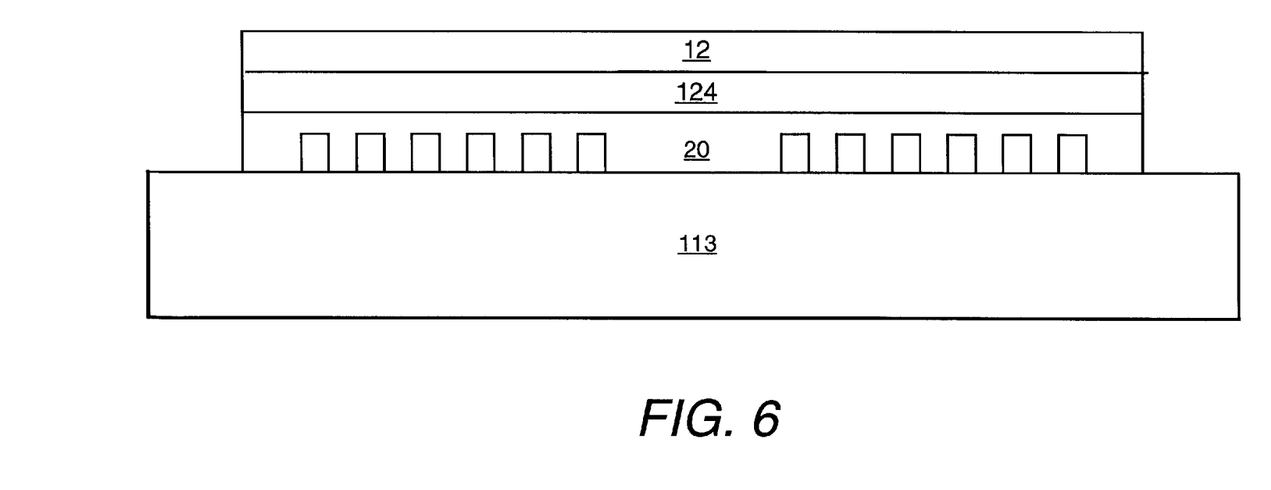
FIG. 6 is a view of an insulative mold insert being laminated to a stamper with an adhesive.

FIG. 6 is a view of an insulative mold insert 12 being laminated to a stamper 20 with an adhesive 124 and illustrates another embodiment of the present invention. In this embodiment, an insert, which may comprise any of the materials discussed with respect to FIGS. 2 and 3, for example, can be applied to the back of a stamper or surface mold form by coating either the mold form or the insert with an adhesive 124 and laminating the two structures together. The adhesive may comprise, for example, a thermoplastic material such as a polyetherimide, acrylic, polyester or other polymer or a thermosetting material such as an epoxy or a thermoplastic/epoxy blend.

Preferably, in the present invention, the insert material is selected to have coefficient of thermal expansion as close to the mold form as feasible. In one embodiment, the insert material comprises KAPTON™ E polyimide having a coefficient of thermal expansion in the plane of the film of about 14–17 ppm/° C. Additionally, in the embodiment, the adhesive comprises a material such as ULTEM™ polyetherimide which does not significantly shrink during curing and has a coefficient of thermal expansion sufficiently close to the thermal expansions of the mold insert and the mold form.

Figure 7:
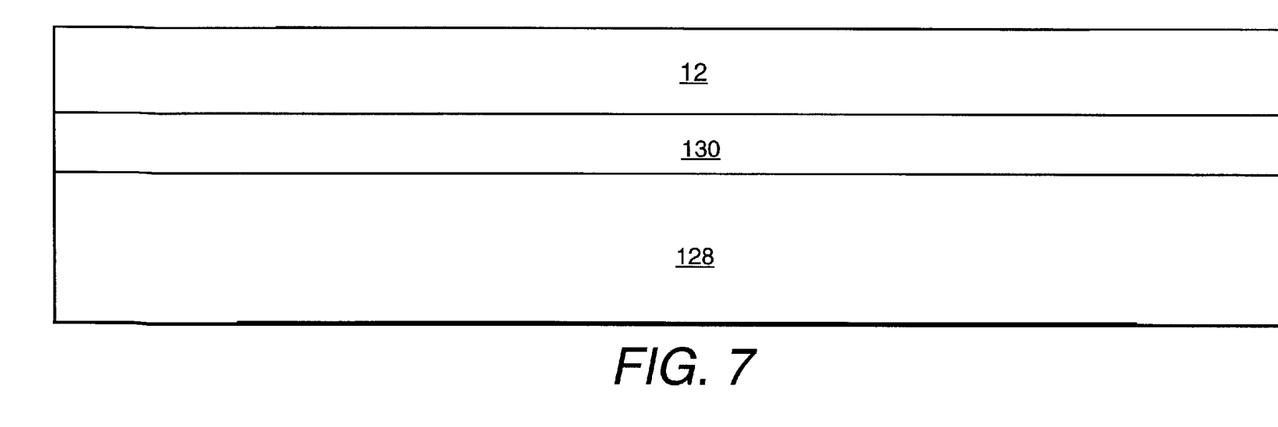
FIG. 7 is a view of an insulative mold insert being formed on a release layer above a substrate.

FIG. 7 is a view of another embodiment of the present invention in which insulative mold insert 12 is formed on a release layer 130 above a substrate 128.

The smooth substrate may comprise a smooth material such as glass or a silicon wafer, for example, or any other highly polished or smooth surface. The release layer may comprise a material such as titanium nitride or gold having a thickness of about 100 angstroms, for example. The release layer is selected to have a lower surface energy than the substrate and thus does not promote adhesion. The release layer can be applied by evaporation or sputtering techniques.

In this embodiment, a smooth free standing insert can be produced by spin coating a solution of liquid insulative mold insert material such as any of the materials discussed with respect to FIG. 4 onto the substrate which has been coated with a release layer. Preferred materials for the liquid insulative mold insert material include polymer solution such as ULTEM polyetherimide and PYRALIN® polyimide (PYRALIN is a trademark of DuPont Co.). Preferably the insert material is spun to a thickness ranging from about 10 microns to about 30 microns.

After the insert material is applied, the insert is cured and removed from the substrate. Potential removal methods include peeling the insert material using tweezers or fingers, or, to avoid hand or instrument contact, by immersing the substrate and insert in a liquid such as water and allowing the insert to float off the substrate.

The above embodiments of FIGS. 2–3 and FIG. 7 relate to stand alone inserts, whereas the embodiments of FIGS. 3–4 and FIG. 6 relate to inserts that are fabricated directly on stampers or smooth surface mold forms. Stand alone inserts have benefits in that they can be used with conventional stampers and that they can be switched and used with a common stamper for different molding applications. Integral inserts, particularly when spun directly on a stamper as in the embodiment of FIGS. 3–4, have the potential benefit of requiring fewer processing/fabrication steps.

Furthermore, it is possible to selectively combine some of the above embodiments. For example, mold inserts fabricated by the release layer method described with respect to FIG. 7 can be coated in the manner described with respect to FIGS. 2 and 3. Additionally, mold inserts fabricated by the embodiments of FIGS. 2 and 3 and FIG. 7 can be laminated in the manner discussed with respect to FIG. 6.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for molding an optical disk comprising:

applying an adhesion promoter on a thermally conductive mold form;

coating a thermally insulative mold insert on the adhesion promoter and the thermally conductive mold form, the mold insert having a coefficient of thermal expansion compatible with the coefficient of thermal expansion of the mold form;

positioning the coated mold form in a thermally conductive mold apparatus with the mold insert positioned between the mold form and the mold apparatus;

injecting a molten thermoplastic material into the mold apparatus;

retaining the molten thermoplastic material in the mold apparatus for a time sufficient for the molten thermoplastic material to cool below its glass transition temperature to form the optical disk; and ejecting the optical disk from the mold apparatus.

2. The method of claim 1 wherein the thermally insulative mold insert comprises at least two layers of thermally insulative mold insert material and wherein the step of coating includes coating a first layer of thermally insulative mold insert material on the mold form, at least partially curing the first layer of thermally insulative mold insert material, coating a second layer of thermally insulative mold insert material, and curing the second layer of insulative mold insert material.

3. The method of claim 1 wherein coating comprises spin coating.

4. The method of claim 1 wherein the mold insert comprises a polyimide.

5. The method of claim 1 wherein coating comprises spray, dip, or meniscus coating the thermally insulative mold insert onto the thermally conductive mold form.

6. A method for molding an optical disk comprising:

applying a thermally insulative mold insert having minimal surface features to an adhesive coated metal frame, heating the thermally insulative mold insert and the metal frame, cooling the thermally insulative mold insert and the metal frame, and then applying a thermally insulative insert coating by spin, spray, dip, or meniscus coating the thermally insulative insert coating to the thermally insulative mold insert to provide at least one coated mold insert having a reduced surface roughness, positioning the at least one coated mold insert between a thermally conductive mold form and a portion of a thermally conductive mold apparatus, injecting a molten thermoplastic material into the mold apparatus, retaining the molten thermoplastic in the mold apparatus for a time sufficient for the molten thermoplastic material to cool below its glass transition temperature to form the optical disk, and ejecting the optical disk from the mold apparatus.

7. A method for molding an optical disk comprising:

securing a thermally insulative mold insert having minimal surface features between two metal rings to provide a flat surface of the thermally insulative mold insert;

applying a thermally insulative insert coating by spin, spray, dip, or meniscus coating the thermally insulative insert coating to at least one thermally insulative mold insert to provide at least one coated mold insert having a reduced surface roughness;

positioning the at least one coated mold insert between a thermally conductive mold form and a portion of a thermally conductive mold apparatus;

injecting a molten thermoplastic material into the mold apparatus;

retaining the molten thermoplastic in the mold apparatus for a time sufficient for the molten thermoplastic material to cool below its glass transition temperature to form the optical disk; and ejecting the optical disk from the mold apparatus.

8. A thermally conductive mold form and a thermally insulative mold insert for being positioned in a mold apparatus for molding molten thermoplastic material into finished optical disks, the mold form and the mold insert comprising a layer comprising an adhesive or an adhesion promoter overlying the mold form, the mold insert being situated on the layer and the mold form, the mold insert having a coefficient of thermal expansion compatible with the coefficient of thermal expansion of the mold form.

9. The mold form of claim 8 wherein the layer comprises an adhesive, the adhesive comprising a material which does not significantly shrink and which has a coefficient of thermal expansion compatible with the coefficients of thermal expansion of the mold form and the mold insert.

10. An optical disk mold apparatus comprising:

at least one thermally conductive mold form at least one thermally insulative mold insert, the mold insert having a coefficient of thermal expansion compatible with the coefficient of thermal expansion of the mold form;

a layer comprising an adhesive or an adhesion promoter overlying the mold form, the mold insert positioned on the layer and the mold form; and a thermally conductive mold apparatus, the at least one coated mold insert positioned between the thermally conductive mold form and a portion of the thermally conductive mold apparatus.

* * * * *